Aug. 6, 1940.  J. W. ROSS  2,210,187
BOTTLE STABILIZER
Filed Sept. 20, 1938
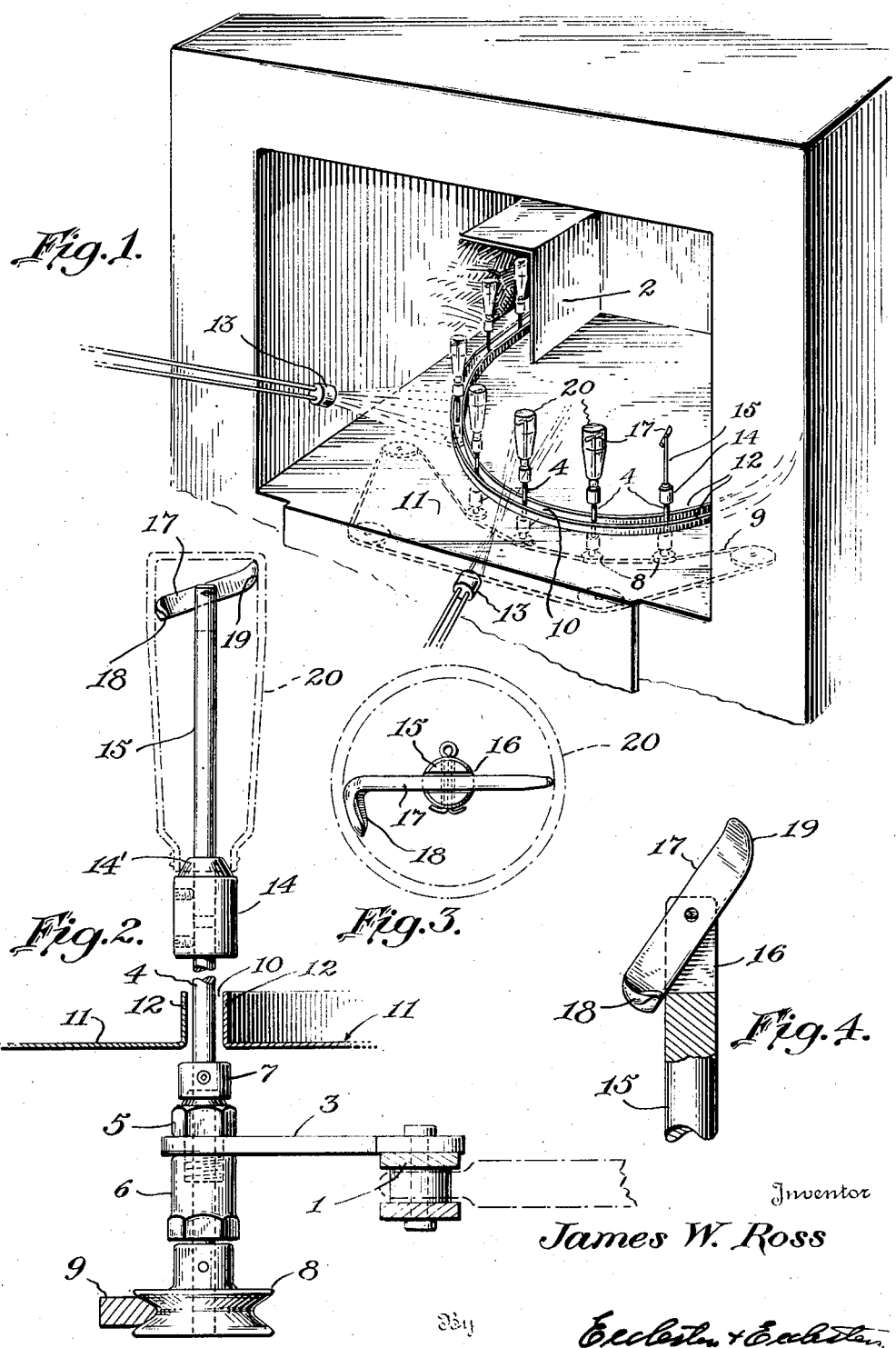
Inventor
James W. Ross Patented Aug. 6, 1940

2,210,187

UNITED STATES PATENT OFFICE 2,210,187

BOTTLE STABILIZER

James W. Ross, Washington, Pa., assignor to Hazel-Atlas Glass Company, Wheeling, W. Va., a corporation of West Virginia Application September 20, 1938, Serial No. 230,887

4 Claims. (Cl. 91—60)

The invention relates to the decoration of glass articles, such as bottles, by spraying, frosting, etching, etc., and more particularly it relates to means for steadying the bottles or other articles while they are being rotated, in the decorating process.

In the decoration of bottles by spraying paint thereon, it is necessary that the bottles be rotated during the spraying process. Heretofore the rotation of the bottles has caused them to wobble, and of course the wobbling movement causes an uneven distribution of the paint. Of course it is not possible to obtain entirely satisfactory results, in spraying processes of decoration, if the paint is not evenly distributed on the container. The object of the present invention therefore is to obtain an even distribution of the paint, in the paint-spraying decoration of glass containers, and similar decorating processes, by preventing wobbling movement of the containers during the rotation thereof.

The invention will be clearly understood from the following detailed description, when taken in connection with the accompanying drawing, in which, Figure 1 is a perspective view of the apparatus for spray-painting glass containers, and setting the paint thereon.

Figure 2 is an enlarged elevational view, with parts in section, of one of the units for rotating the containers and steadying the containers during the rotation.

Figure 3 is a plan view of the steadying device, and

Figure 4 is a fragmentary elevational view of the steadying device.

Referring to the drawing in more detail, numeral 1 indicates an endless chain conveyer, which is preferably continuously moving, and which is adapted to carry the containers through a burner or heating apparatus, referred to by numeral 2. Of course the heating apparatus is for setting the paint, and may be of any desired form.

At properly spaced intervals the endless conveyer is provided with laterally projecting brackets 3, and each of these brackets carries a unit for supporting and rotating a bottle. All of these units are of the same construction, and the description of one of them is therefore sufficient. Numeral 4 refers to a vertical spindle which is rotatably mounted in the bracket 3, by any desired means. In the specific embodiment illustrated, a bearing 5 is supported on the bracket and has a threaded portion passing through an opening in the bracket. A nut 6 is threaded on the bearing, whereby the bearing is firmly secured to the bracket. The spindle 4, which passes through this bearing, is provided with a collar, which rests on the bearing 5 and supports the spindle.

Attached to the lower end of the spindle 4, is a pulley 8. As previously mentioned, the spindles are carried in an endless path by the chain conveyer 1, and as the spindles successively approach the point where the bottles are to be sprayed with paint, it is necessary that the spindles be rotated. This is accomplished, in the present embodiment, by a strap 9 which the pulleys 8 frictionally engage while travelling through the spraying zone, as clearly shown in Figure 1.

The vertical spindles, in their semi-circular path of travel through the spraying zone, enroute to the heating apparatus, project upwardly through a slot 10 provided in a plate 11. And the plate is preferably provided with upstanding flanges 12 extending along the sides of the slot. The purpose of the plate of course is to receive the excess paint and thereby shield the conveyer and other apparatus beneath the plate.

Numeral 13 refers to the devices for spraying the paint on the bottles to be decorated. Only two of the spraying devices are shown in the drawing, but of course any desired number may be employed, and they may be of any preferred type and positioned to produce the best results.

Numeral 14 indicates a sleeve which is attached to the upper end of the spindle 4, preferably by a set screw. The upper end of the sleeve is adapted to receive the lower end of a rod 15, which may be vertically adjusted by means of a set screw. The upper portion of the sleeve is preferably beveled or tapered, as indicated by numeral 14', to readily receive and fit the mouth of a glass container.

The upper end of the rod is slotted, as indicated by numeral 16, and pivotally attached to the upper end of the rod is a steadying member or arm 17.

This steadying arm is preferably mounted midway of its ends, and when not in use it assumes an upwardly inclined position, as shown in Figure 4. Any desired form of counterweight may be employed, for causing the arm to assume such position, but in the preferred embodiment illustrated the end of the arm is provided with an arcuate flange 18, which is preferably of substantially the same curvature as that of the bottle or other glass container with which it is to be employed. This arcuate flange not only acts as a counterweight, but also assists in preventing wobbling of the container.

In the present form the arcuate flange also prevents the steadying arm from assuming a vertical position when not in use, regardless of the depth of the slot 16. But this slot is preferably of such depth that its base will act as a stop, to prevent the arm from assuming a vertical position. So that even if the flange is omitted, the arm always assumes an inclined position when in inoperative position.

The upper end of the steadying arm is preferably curved or beveled, as indicated by numeral 19, so that the mouth of the bottle will more readily pass over it, without moving that end downwardly, which would prevent the arm from entering the neck of the bottle. A bottle to be decorated, is referred to by numeral 20.

In operation, the continuously travelling conveyer 1 brings the bottle receiving units successively into the spraying zone; bottles being placed on the units before they reach the spraying zone. During the spraying operation the bottles are carried forward toward the heating apparatus, and are rotated by any desired means, as by the pulleys 8 engaging the strap or belt 9. The continued movement of the conveyer carries the decorated containers to the heating apparatus.

When a bottle is placed on a receiving unit, the mouth of the bottle passes downwardly over the upwardly inclined steadying arm 17 and rod 15, and is seated on the beveled portion 14' of sleeve 14. Just before the bottle is seated, the base of the bottle strikes the upwardly projecting end of the steadying arm, and the further downward movement of the bottle causes the arm to assume a position similar to that shown in Figure 2, so that the ends of the arm firmly grip the sides of the bottle, and prevent any wobbling movement during the rotation thereof. And the curved flange 18 also assists in accomplishing this desirable result.

This device also takes care of variations in the diameter and height of the bottles, within certain limits. If bottles of slightly greater diameter are to be decorated, the steadying arm 17 will assume a more nearly horizontal position before the ends of the arm grip the sides of the bottle. Of course the rod 15 will be vertically adjusted in the sleeve 14, so that the steadying arm will be moved to gripping position when the bottle neck seats on the beveled portion of the sleeve.

By reason of this device the bottles are maintained steady while being rotated and sprayed with paint, so that the paint is evenly distributed on the bottles. The appearance of the decorated containers is greatly improved thereby.

While the invention has been particularly described in connection with the decoration of containers by the spraying method, yet it will be apparent to those skilled in the art, the invention is equally well adapted to other types of decoration, such as frosting, etching, etc.

The invention is susceptible to various changes and modifications, and all such changes and modifications are intended to be included within the scope of the appended claims.

What I claim is:

1. An apparatus for conveying containers, including a conveyer, spaced container receiving units carried by the conveyer, means for rotating the units, each unit including an upstanding rod, means movably mounted on the rod for gripping the sides of the container in the interior thereof, and means for causing said gripping means to be upwardly inclined when in inoperative position, said gripping means being so positioned as to be operated to engage the sides of the container by contact with the base of the container.

2. An apparatus for conveying glass containers, including a conveyer, spaced container receiving units carried by the conveyer, means for rotating the units, each unit including an upstanding rod, means carried by the rod for gripping the sides of a container on the interior thereof, said gripping means including an arm pivotally mounted at its center, and means for causing said arm to be upwardly inclined when in inoperative position, said arm being moved toward a horizontal gripping position by engagement with a container placed on the unit.

3. An apparatus for conveying glass containers, including a conveyer, spaced container receiving units carried by the conveyer, means for rotating the units, and means associated with each unit for gripping the sides of a container on the interior thereof, said gripping means including a pivotally mounted arm, said arm when in inoperative position being upwardly inclined, an arcuate flange on the lower end of the arm, said arm being moved toward a horizontal gripping position by placing a container on a receiving unit.

4. An apparatus for conveying glass containers, including a conveyer, spaced container receiving units carried by the conveyer, means for rotating the units, each unit including an upstanding rod, means movably mounted on the rod for gripping the sides of a container on the interior thereof, means for causing said gripping means to assume an inclined inoperative position, said gripping means when in inclined position being of less width then the neck of the container, said gripping means when in operative position being of greater width than the neck of the container and engaging the sides of the container, and said gripping means constructed and arranged to be moved from inoperative to operative position by engagement with the base of a container being positioned on a unit.

JAMES W. ROSS.